(12) United States Patent
Lan et al.

(10) Patent No.: US 12,324,779 B2
(45) Date of Patent: Jun. 10, 2025

(54) INTELLIGENT MULTIPOINT BEDRIDDEN EXCRETION AND AUTOMATIC CLEANING AND WATER FILLING TREATMENT SYSTEM

(71) Applicants: Jinghe Lan, Guangdong (CN); Mingyang Cai, Guangdong (CN)

(72) Inventors: Jinghe Lan, Guangdong (CN); Mingyang Cai, Guangdong (CN)

( * ) Notice: Subject to any disclaimer, the term of this patent is extended or adjusted under 35 U.S.C. 154(b) by 245 days.

(21) Appl. No.: 18/213,892

(22) Filed: Jun. 26, 2023

(65) Prior Publication Data
US 2023/0329942 A1  Oct. 19, 2023

(30) Foreign Application Priority Data
May 22, 2023  (CN) .......................... 202310578070.4

(51) Int. Cl.
*A61G 9/02*  (2006.01)
*A61G 7/02*  (2006.01)

(52) U.S. Cl.
CPC .................. *A61G 9/02* (2013.01); *A61G 7/02* (2013.01); *A61G 2203/30* (2013.01)

(58) Field of Classification Search
CPC . A61G 7/02; A61G 7/008; A61G 9/00; A61G 9/003; A61G 7/05; Y02A 50/30
See application file for complete search history.

(56) References Cited

U.S. PATENT DOCUMENTS

| 8,302,226 B2 * | 11/2012 | Hu .......................... A61G 9/003 5/604 |
| 9,918,887 B1 * | 3/2018 | Wolter, III ............... A61G 7/02 |
| 2022/0160558 A1 * | 5/2022 | Gordon .................... A61G 7/02 |

FOREIGN PATENT DOCUMENTS

CN  117695107 A  *  3/2024

* cited by examiner

*Primary Examiner* — Fredrick C Conley
(74) *Attorney, Agent, or Firm* — Birchwood IP

(57) ABSTRACT

A multipoint bed excretion and automatic cleaning and water filling treatment system includes a robot, a main machine, a bed, and an excrement collector disposed in the bed. The excrement collector includes an installation block disposed in the bed, an installation seat disposed on top of the installation block, a flap pivotably disposed externally of the installation seat, and a cleaning nozzle disposed in the flap. The robot includes a waste collection mechanism. The main machine includes a waste discharge mechanism. The waste discharge mechanism includes a first collection box and a first booster pump disposed in the main machine. Input of the first booster pump is connected to a first waste collection pipe extending externally of the main machine. Bottom of the installation block is connected to a first waste discharge pipe extending externally of the bed.

10 Claims, 8 Drawing Sheets

INTELLIGENT MULTIPOINT BEDRIDDEN EXCRETION AND AUTOMATIC CLEANING AND WATER FILLING TREATMENT SYSTEM

BACKGROUND OF THE INVENTION

1. Field of the Invention

The invention relates to intelligent device technologies and more particularly to an intelligent multipoint bedridden excretion and automatic cleaning and water filling treatment system.

2. Description of Related Art

The seventh population census shows that out of the total population 264,018,766 people are aged 60 and above, accounting for 18.70%, and 190,635,280 people are aged 65 and above, accounting for 13.50%. Compared to the sixth population census in 2010, the proportion of people aged 60 and above has increased by 5.44 percentage points, and the proportion of people aged 65 and above has increased by 4.63 percentage points. According to statistics from the Ministry of Civil Affairs and the National Health Commission, there are currently 42 million disabled and semi-disabled elderly people in China, and only 300,000 people are engaged in elderly care and nursing. The huge gap in the number of nursing staff is revealed by these contrasting figures. Taking some of the most exhausting, smelly, and dirty tasks in daily care through intelligent technology products can help alleviate the intensity of nursing staff's labor, which is very meaningful.

The care work for bedridden patients mainly revolves around "eating, drinking, defecating and sleeping," among which excretion handling is the focus of nursing work. With the development of technology, science and technology workers have developed bedridden automatic excretion handling products, which have effectively solved the problem of urine and excretion care for bedridden patients. The product form is basically a bed equipped with an excretion collector, a main machine, and a specialized mattress. Some products, to save trouble, do not even have a mattress, and simply consist of a main machine and an excretion collector pouch. However, the problem with this approach is that when a main machine signals that the water is low or the wastewater is full, the nursing staff needs to promptly replenish the water or empty the wastewater, and they need to periodically inspect each main machine to check the status of the machine. As a result, the workload of nursing staff has only shifted from changing diapers to adding water, emptying wastewater, and inspecting equipment. The dirty and smelly problems in excretion care have been partially solved, but the tiring workload has not been significantly reduced; the workload of nursing staff might have even increased. Moreover, because nursing staff need to have a good understanding of various product warning information and corresponding response measures, nursing staff who are generally older are unevenly prepared for these key points, which leads to products not being well used. More intelligent, simplified, and foolproof easy-to-use bedridden excretion handling systems are the trend. The control technology of this intelligent distributed bedridden excretion and responsive fully-automatic cleaning and water filling treatment system is the core of the system, hence proposing an intelligent multipoint bedridden excretion and automatic cleaning and water filling treatment system to solve the problems mentioned above.

SUMMARY OF THE INVENTION

In view of the deficiencies of the conventional art, the invention provides an intelligent multipoint bedridden excretion and automatic cleaning and water filling treatment system, which has the advantages of easy water filling and cleaning, and solves the problems of dirty, tired, and smelly work in nursing work from the previous diaper changing task to the task of adding water, pouring wastewater, and inspecting equipment.

To achieve the above objectives, the invention provides the following technical solution: an intelligent multipoint bedridden excretion and automatic cleaning and water filling treatment system, including a robot, a main machine, a distributed bedridden care bed and a fixedly installed excretion collection device within the distributed bedridden care bed. The excretion collection device comprises a mounting block fixedly installed within the distributed bedridden care bed, a mounting seat fixedly installed on top of the mounting block, and a flap pivotably installed on the outside of the mounting seat. A cleaning nozzle is fixedly installed on the inner side of the flap, and a waste collection mechanism is provided within the robot. A waste discharge mechanism is provided within the main machine.

The waste discharge mechanism includes a first collection box and a first booster pump fixedly installed within the main machine. The input end of the first booster pump is fixedly connected to a first waste collection pipe extending to the outside of the main machine, and the bottom of the mounting block is fixedly connected to a first waste discharge pipe extending to the outside of the distributed bedridden care bed. The first waste discharge pipe is fixedly connected to the first waste collection pipe.

The waste collection mechanism includes a second collection box and a second booster pump fixedly installed within the robot. A second connection pipe communicating with the input end of the second booster pump is fixedly installed on the left side of the robot. On one side of the second collection box far from the second booster pump, a second waste discharge pipe extending to the outside of the robot is fixedly connected, and a third electromagnetic valve extending to the outside thereof is fixedly installed inside the second waste discharge pipe.

Further, there are two waste discharge mechanisms, and the output end of the first booster pump in another waste discharge mechanism is fixedly connected to a first cleaning pipe extending to the outside of the main machine, and the first cleaning pipe is fixedly connected to the cleaning nozzle. A first connection pipe communicating with the first collection box is provided on the right side of the main machine, and the two first booster pumps are respectively connected to the two first collection boxes.

Further, the first connection pipe internally fixedly installs a first electromagnetic valve extending to the outside thereof, and the second connection pipe internally fixedly installs a second electromagnetic valve extending to the outside thereof.

Further, the outer side of the first connection pipe at the end far away from the main machine is fixedly installed with a first electromagnetic block, and the outer side of the second connection pipe at the end far away from the robot is fixedly installed with a second electromagnetic block. The first connection pipe is fixed to the second connection pipe by a first electromagnetic block and a second electromagnetic block, and the first connection pipe is connected to the second connection pipe.

Further, a first drain baffle matching the height of the first connection pipe is installed inside the first collection box, and a second drain baffle matching the height of the second waste discharge pipe is fixedly installed inside the second collection box.

Further, four symmetrical distribution mobile wheels are fixedly installed inside both the robot and the main machine. The left side of the robot and the left side of the main machine have different sizes of mobile wheels compared to the right side.

Further, partition panels are fixedly installed between the left and right inner walls of the robot and the main machine, and disinfection mechanisms are provided on both partition panels. The disinfection mechanism comprises a disinfection box, a third booster pump, an output pipe, a nozzle, and a linear actuator.

Further, the disinfection box and the linear actuator are fixedly installed on the upper and lower sides of the partition panel, respectively. The nozzle is fixedly connected to the bottom of the output pipe, and the output pipe is fixedly installed on the output end of the linear actuator.

Further, a connecting pipe is fixedly connected to the output end of the third booster pump and communicates with the output pipe. The two third booster pumps are respectively fixedly installed on the left inner walls of the robot and the main machine, and the first collection box and the second collection box have perforations provided therein, and the two output pipes can extend into the first collection box and the second collection box through the perforations.

Further, two symmetrical distribution cameras are fixedly installed on the outside of the left output pipe, and a first liquid level sensor is fixedly installed inside the two disinfection boxes.

The invention has the following advantages and benefits in comparison with the conventional art:

The intelligent multipoint bedridden excretion and automatic cleaning and water filling treatment system. Through the cooperation of the first waste discharge pipe, the first waste collection pipe, and one of the first booster pumps, the patient's excrement is discharged into one of the first collection boxes, after the patient's excrement is discharged, another first booster pump is started to transport the water inside the first collection box, which is finally sprayed out by the cleaning nozzle, thereby cleaning the patient, then, the main machine transmits the signal to the robot, and the robot comes to the side of the main machine transmitting the signal after receiving the signal, through the magnetic attraction of the first electromagnetic block and the second electromagnetic block, the first connection pipe and the second connection pipe are connected, then, the first and second electromagnetic valves are opened, and the second booster pump is started to transport the waste inside the first collection box to the inside of the second collection box, at the same time, another second connection pipe and second booster pump transport the clean water inside the second collection box to the inside of the main machine, after the waste is discharged, the robot returns to the charging area for excretion, the combination of the collection device, the waste discharge mechanism, and the waste collection mechanism makes it easy for bedridden people to have bowel movements, there is no need for manual intervention, which achieves the advantages of easy water filling and cleaning, and solves the problems of dirty, tired, and smelly work in nursing work from the diaper changing to the task of adding water, pouring wastewater, and inspecting equipment.

The intelligent multipoint bedridden excretion and automatic cleaning and water filling treatment system, by activating the linear actuator, the water delivery pipe moves downward, and at this time, the water delivery pipe extends into the first collection box and the second collection box through the perforations, the third booster pump is started to spray the disinfectant inside the disinfection box into the first and second collection boxes, thereby disinfecting the first and second collection boxes containing waste, at the same time, through the camera, the nursing staff only needs to use the mobile app of the entire system to know how many times the bedridden person defecates and urinates in a day, and even the detailed information such as the time of each defecation and urination, and even the color and amount of defecation and urination can be checked if needed, family members can also learn about the elder's defecation and urination situation in the nursing home through their mobile phones.

The above and other objects, features and advantages of the invention will become apparent from the following detailed description taken with the accompanying drawings.

DETAILED DESCRIPTION OF THE INVENTION

Figure 1:
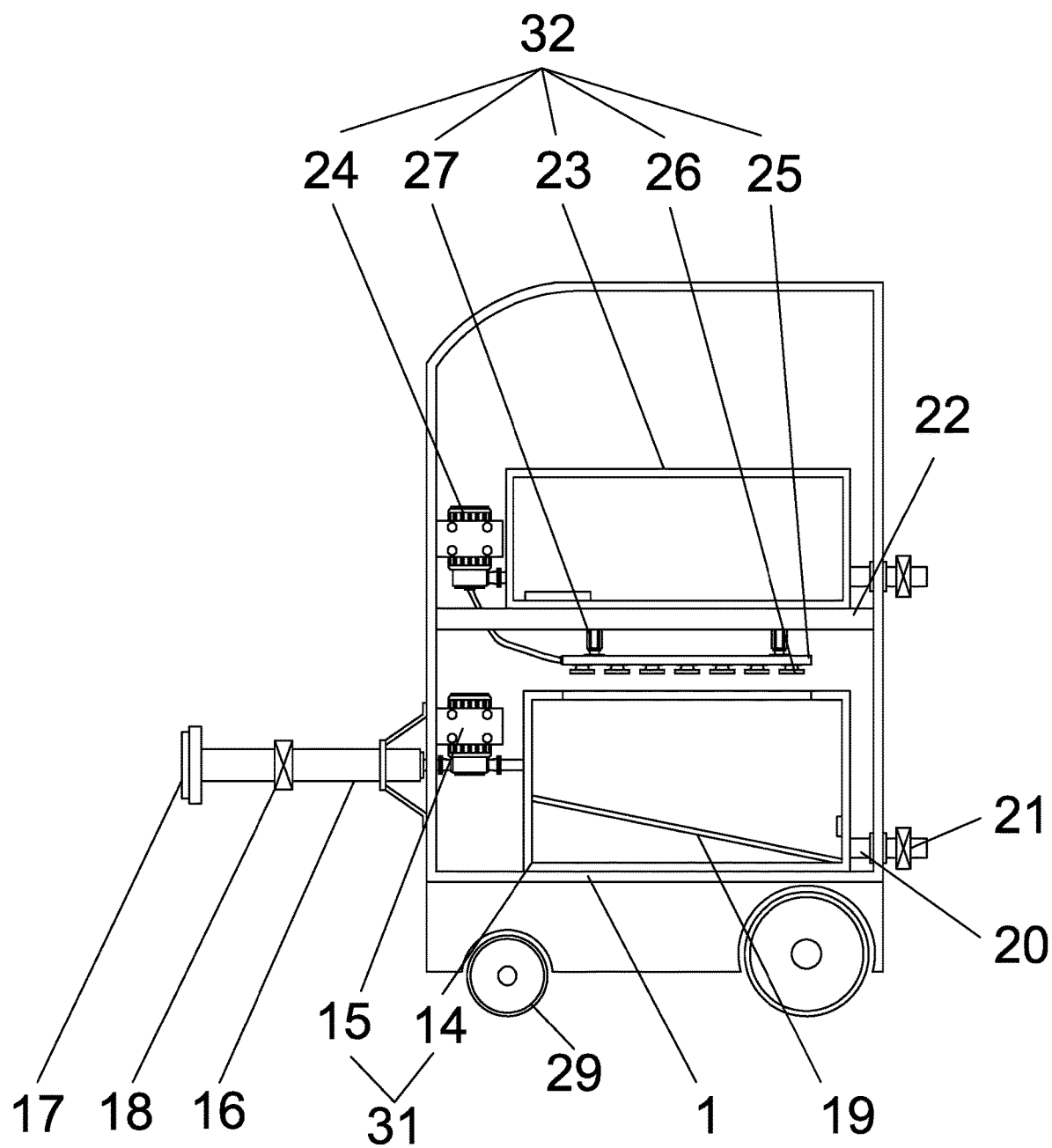
FIG. 1 is a schematic longitudinal sectional view of a robot of an intelligent multipoint bedridden excretion and automatic cleaning and water filling treatment of the invention.
Figure 2:
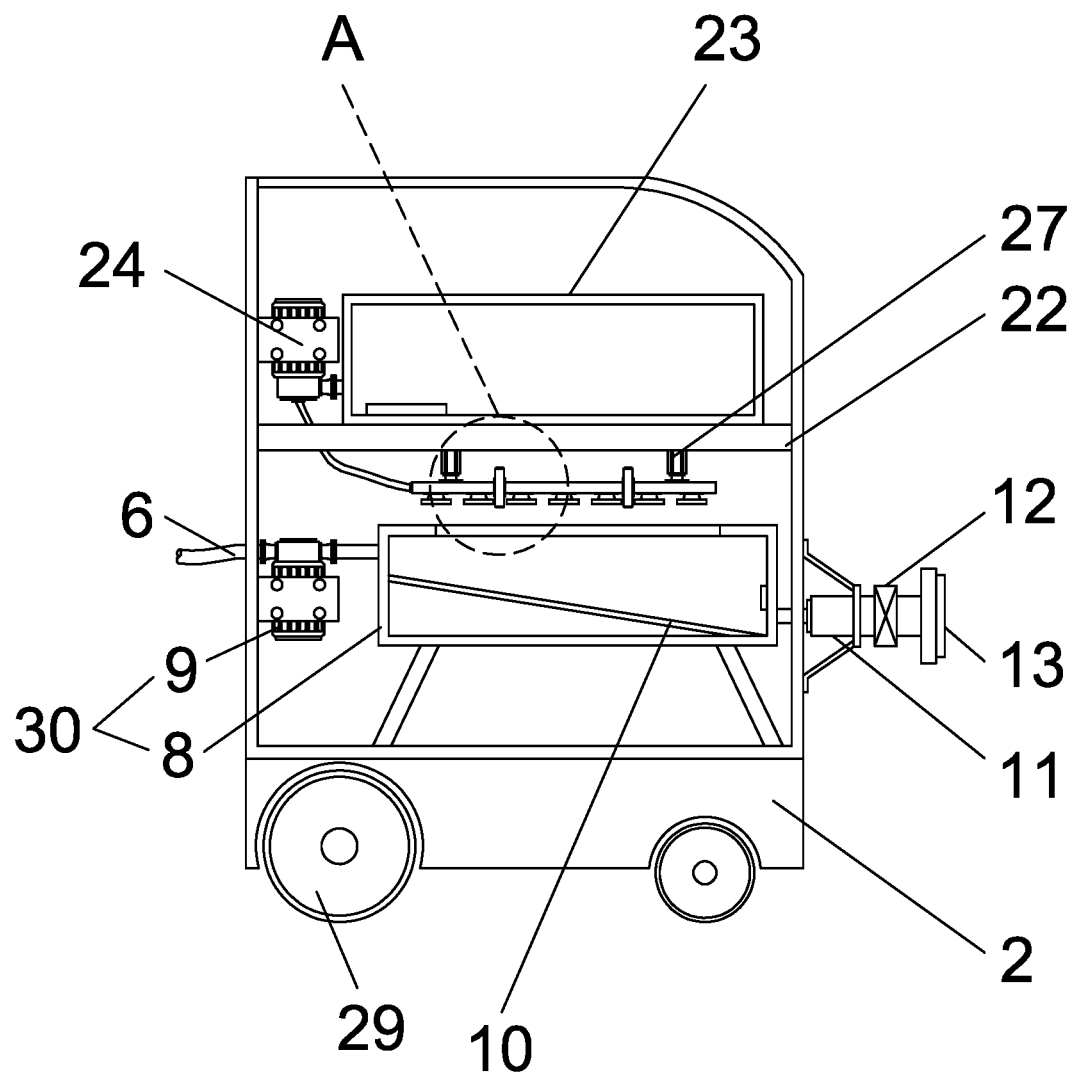
FIG. 2 is a schematic longitudinal sectional view of a main machine of the intelligent multipoint bedridden excretion and automatic cleaning and water filling treatment of the invention.
Figure 3:
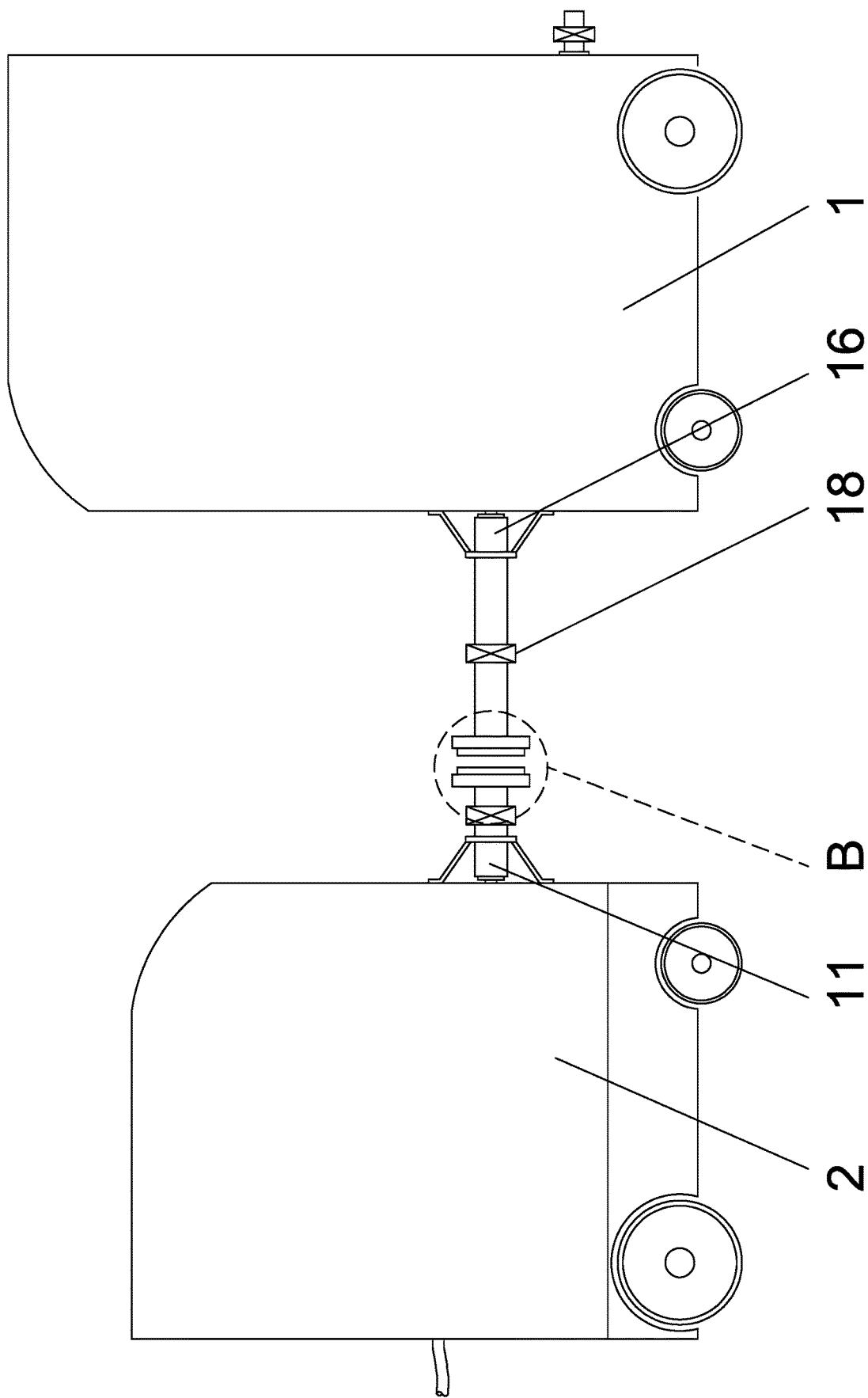
FIG. 3 is a side elevation of the intelligent multipoint bedridden excretion and automatic cleaning and water filling treatment of the invention.
Figure 4:
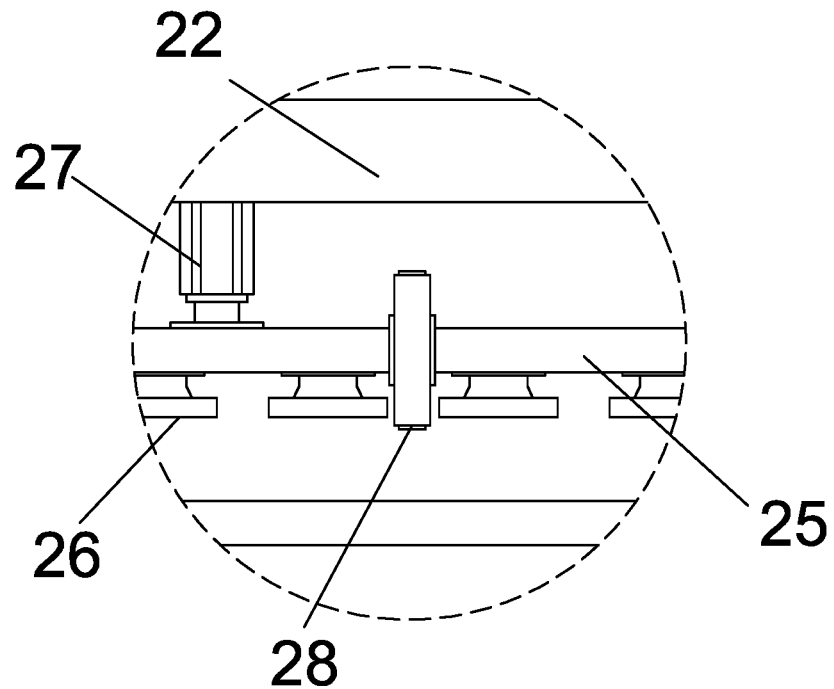
FIG. 4 is a detailed view of the area in circle A in FIG. 2.
Figure 5:
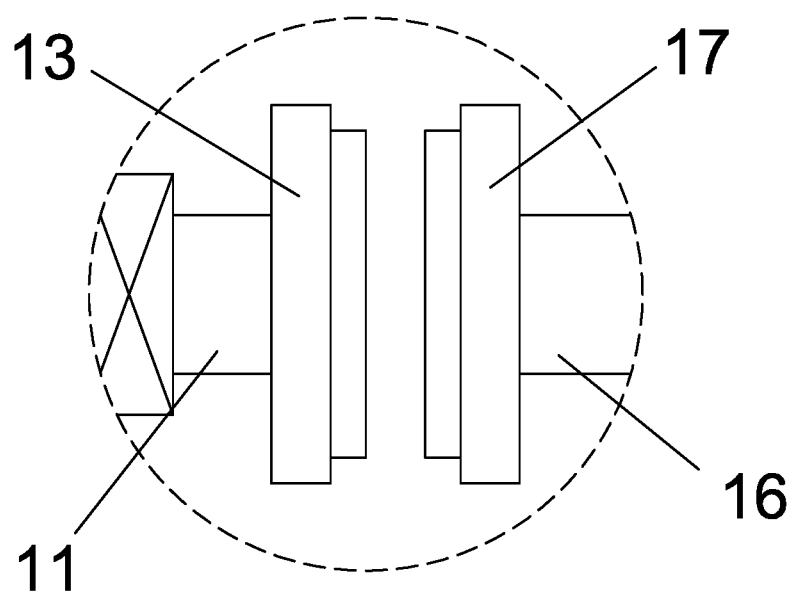
FIG. 5 is a detailed view of the area in circle B in FIG. 3.
Figure 6:
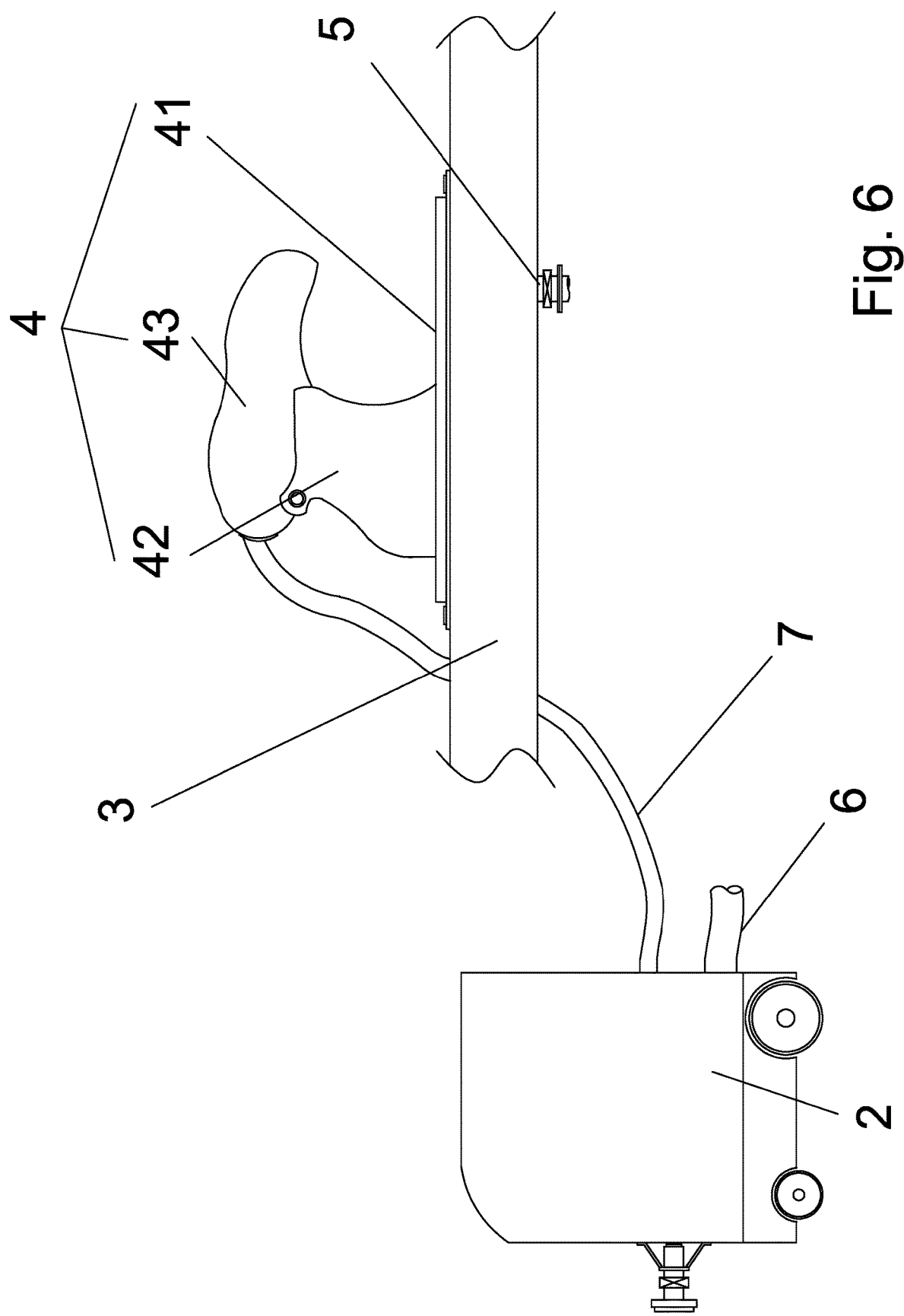
FIG. 6 schematically depicts an excretion collector connected to the main machine.
Figure 7:
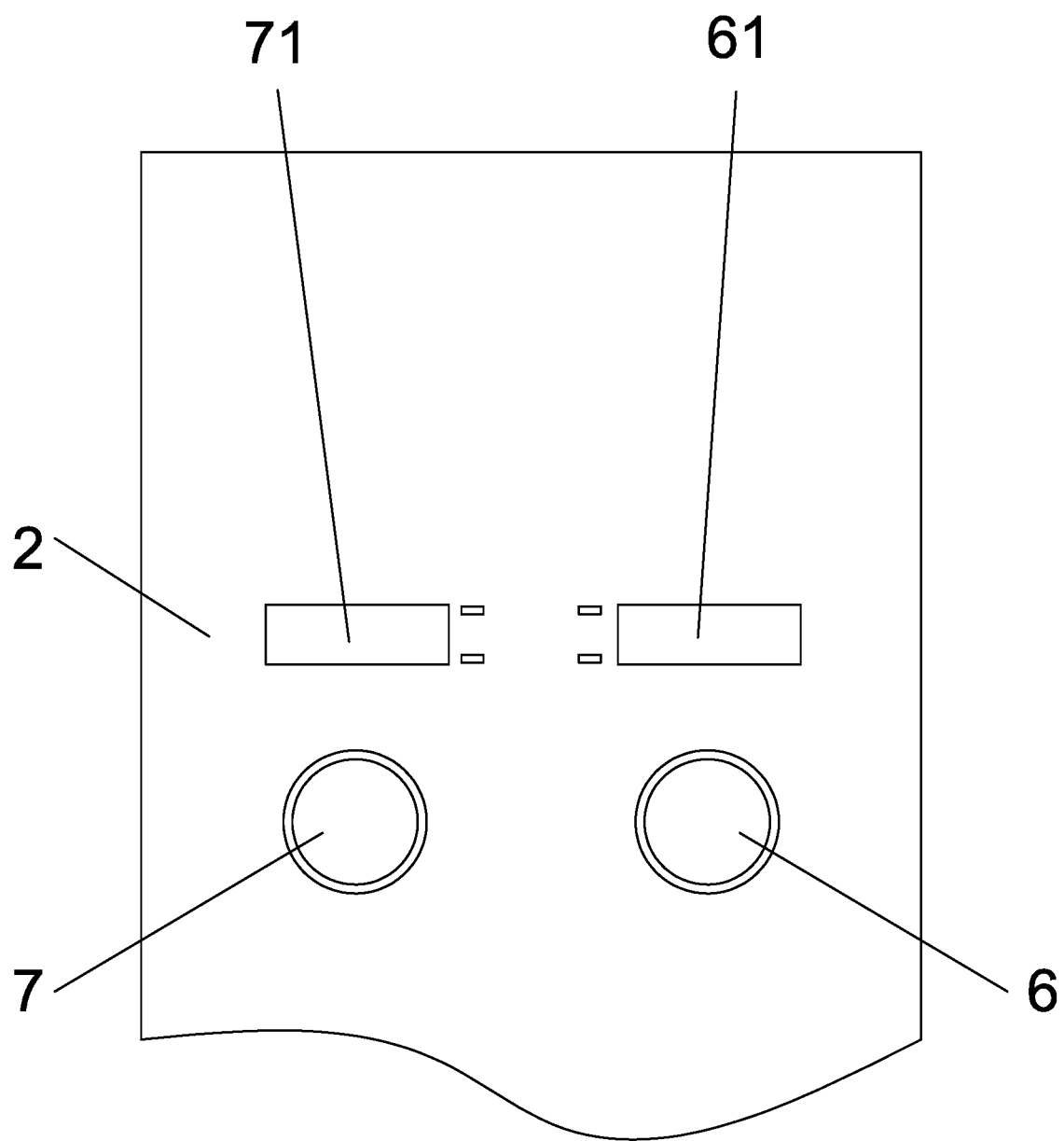
FIG. 7 is a side elevation of the robot.
Figure 8:
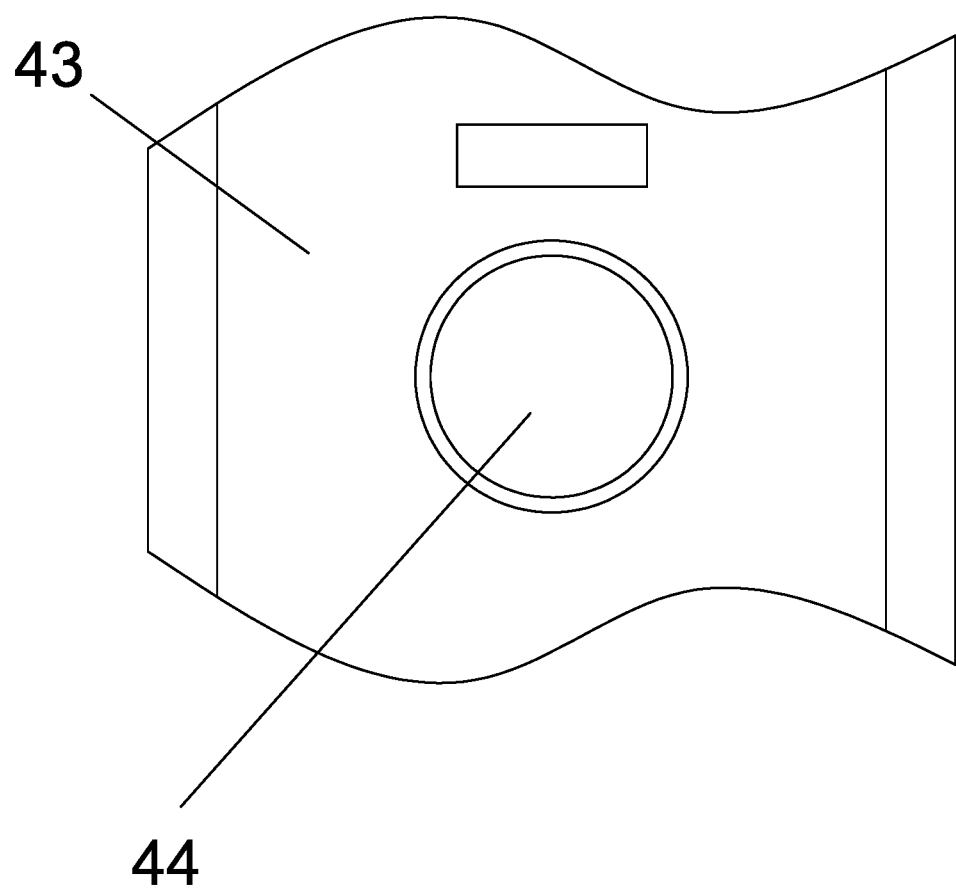
FIG. 8 schematically depicts a cleaning nozzle and the flap of the robot.
Figure 9:
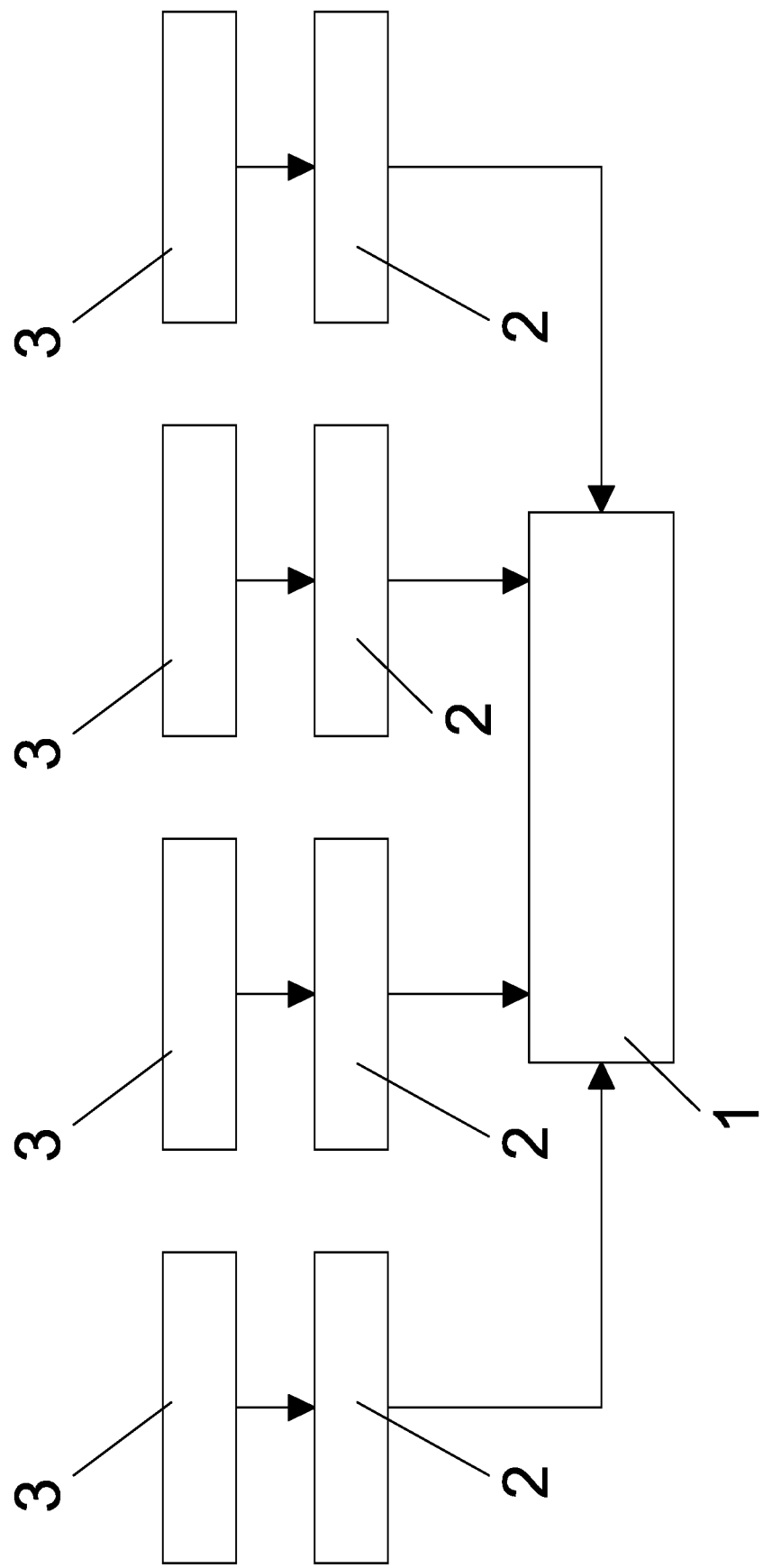
FIG. 9 is a block diagram of the robot, the main machines and the beds of the intelligent multipoint bedridden excretion and automatic cleaning and water filling treatment system being connected together.

Referring to FIGS. 1-9, an intelligent multipoint bedridden excretion and automatic cleaning and water filling treatment system of the invention comprises a robot 1, a main machine 2, a bed 3, and an excretion collector 4 fixedly installed inside the bed 3. The excretion collector 4 includes an installation block 41 fixedly installed inside the bed 3, an installation seat 42 fixedly installed at the top of the installation block 41, and a flap 43 pivotably installed outside the installation seat 42. The inside of the flap 43 is fixedly equipped with a cleaning nozzle 44. The outside of the installation block 41 is provided with a protective pad, which is convenient for the protection of the elderly.

Moreover, the bedside of the bed 3 is equipped with a controller, which can operate the robot 1 and the main machine 2 through the controller, facilitating the elderly to discharge waste. The robot 1 and the main machine 2 are used in combination and controlled by a PLC controller to achieve an intelligent effect.

In this embodiment, the main machine 2 is internally provided with a waste discharge mechanism 30; the waste discharge mechanism 30 includes a first collection box 8 fixedly installed inside the main machine 2 and a first booster pump 9. The input end of the first booster pump 9 is fixedly connected to a first waste collection pipe 6 having a waste port 61 extending to the outside of the main machine 2. The bottom of the installation block 41 is fixedly connected to a first waste discharge pipe 5 extending to the outside of the bed 3, and the first waste discharge pipe 5 is fixedly connected to the first waste collection pipe 6. Inside the first waste discharge pipe 5, there is fixedly installed a fourth electromagnetic valve extending to the outside, which is convenient for discharging waste through the first waste discharge pipe 5 into the interior of the main machine 2.

There are two waste discharge mechanisms 30, and the output end of the first booster pump 9 in the other waste discharge mechanism 30 is fixedly connected to a first cleaning pipe 7 having a clean water port 71 extending to the outside of the main machine 2, and the first cleaning pipe 7 is fixedly connected to the cleaning nozzle 44. On the right side of the main machine 2 is installed a first connecting pipe 11 communicating with the first collection box 8, and the two first booster pumps 9 are connected to the two first collection boxes 8, respectively.

It needs to be pointed out that the two first collection boxes 8 are used for filling clean water and loading waste, and the first collection box 8 connected to the first cleaning pipe 7 is a clean water box, which cooperates with the cleaning nozzle 44 to clean the elderly. And the first collection box 8 for loading waste is used for collecting waste in the first waste discharge pipe 5 through the first waste collection pipe 6.

In this embodiment, the robot 1 is internally provided with a waste collection mechanism 31 including a second collection box 14 fixedly installed inside the robot 1 and a second booster pump 15. On the left side of the robot 1, there is fixedly installed a second connecting pipe 16 that communicates with the input end of the second booster pump 15. The side of the second collection box 14 far from the second booster pump 15 is fixedly connected to a second waste discharge pipe 20 extending to the outside of the robot 1, and inside the second waste discharge pipe 20, there is fixedly installed a third electromagnetic valve 21 extending to the outside. The first connecting pipe 11 is internally provided with a first electromagnetic valve 12 extending to the outside, and the second connecting pipe 16 is internally provided with a second electromagnetic valve 18 extending to the outside. The installation of the third electromagnetic valve 21 facilitates the discharge of the waste inside the second collection box 14 through the second waste discharge pipe 20.

It needs to be pointed out that the two second collection boxes 14 are used for collecting waste and filling clean water, which is convenient for adding clean water to the interior of the main machine 2, thus facilitating the use of the cleaning nozzle 44. First, the first electromagnetic block 13 is fixedly installed on the outer side of the first connecting pipe 11 far from the main machine 2. A second electromagnetic block 17 is fixedly installed on the outer side of the second connecting pipe 16 far from the robot 1. The first connecting pipe 11 is fixed to the second connecting pipe 16 through the first electromagnet 13 and the second electromagnet 17, and the first connecting pipe 11 is connected to the second connecting pipe 16. By energizing the first electromagnetic block 13 and the second electromagnetic block 17, the first connecting pipe 11 can be connected to the second connecting pipe 16.

In addition, the heights of the second connecting pipe 16 and the first connecting pipe 11 are matched.

Furthermore, a first drainage plate 10 matching the height of the first connecting pipe 11 is installed inside the first collection box 8, and a second drainage plate 19 matching the height of the second waste discharge pipe 20 is fixedly installed inside the second collection box 14. The first drainage plate 10 facilitates the first collection box 8 containing waste materials to be discharged for waste treatment. The second drainage plate 19 facilitates waste treatment in conjunction with the second waste discharge pipe 20.

In this embodiment, the interiors of the robot 1 and the main machine 2 are fixedly equipped with symmetrically distributed four wheels 29, and the sizes of the left two wheels 29 and the right two wheels 29 are not the same.

It needs to be pointed out that inside the two first collection boxes 8 and the two second collection boxes 14, there are fixedly installed second water level sensors extending to the outside, which are convenient for timely waste discharge and water filling.

In this embodiment, partition plates 22 are fixedly installed between the robot 1 and the left and right inner walls of the main machine 2, and a disinfection mechanism 32 is set up on each of the partition plates 22. The disinfection mechanism 32 includes a disinfection box 23, a third booster pump 24, an output pipe 25, a nozzle 26, and a linear actuator 27. The disinfection box 23 and the linear actuator 27 are fixedly installed on the upper and lower sides of the partition plate 22, the nozzle 26 is fixedly connected to the bottom of the output pipe 25, and the output pipe 25 is fixedly installed on the output end of the linear actuator 27. The output end of the third booster pump 24 is fixedly connected to a connection pipe that is connected to the output pipe 25. The two third booster pumps 24 are fixedly installed on the left inner wall of the robot 1 and the main machine 2, respectively. The first collection box 8 and the second collection box 14 both have perforations on their interior, and the two output pipes 25 can extend into the interiors of the first and second collection boxes 8 and 14 through the perforations. By starting the linear actuator 27, the water pipe 25 is driven to move downwards. At this time, the water pipe 25 extends into the interiors of the first and second collection boxes 8 and 14 through the perforations. The third booster pump 24 is started to spray the disinfectant in the disinfection box 23 into the interiors of the first and second collection boxes 8 and 14, thereby disinfecting the first and second collection boxes 8 and 24 containing waste.

It should be noted that the perforations are only set up in the interiors of the first and second collection boxes 8 and 14 containing waste.

Externally, the left output pipe 25 is fixedly installed with two symmetrically distributed cameras 28, and a first water level sensor is fixedly installed inside the two disinfection boxes 23. The cameras make it easy to observe the excretion status of the elderly.

Understandably, caregivers only need to use the mobile APP of the entire system to know how many times the elderly defecate and urinate in a day. They can even view the details, such as the times and frequencies of urination and defecation, and when necessary, they can check the color and volume of the feces and urine. Family members can also understand the elder's defecation situation in the nursing home in detail through their mobile phones.

The beneficial effects of the above embodiment of the invention are as follows:

The intelligent multipoint bedridden excretion and automatic cleaning and water filling treatment system can lead the patient's waste into the interior of one of the first collection boxes 8 by the cooperative use of the first excretion pipe 5, the first waste collection pipe 6, and one of the first booster pumps 9. After the patient's waste is discharged, another first booster pump 9 is started to transport the water inside the first collection box 8, which is finally sprayed out by the cleaning mouth 44, thereby washing the patient. Then the main machine 2 transmits the signal to the robot 1, and the robot 1 comes to the side of the main machine 2 transmitting the signal. Through the magnetic attraction between the first electromagnet 13 and the second electromagnet 17, the first connecting pipe 11 and the second connecting pipe 16 are connected. Then the first electromagnetic valve 12 and the second electromagnetic valve 18 are opened, the second booster pump 15 is started, the waste inside the . . . the waste inside the first collection box 8 is transported to the interior of the second collection box 14. At the same time, another second connecting pipe 16 and a second booster pump 15 transport the clean water inside the second collection box 14 to the interior of the main machine 2. After the waste is discharged, the robot returns to the charging area for excretion. Through the use of the toilet 4, the excretion mechanism, and the waste collection mechanism, it is convenient to deal with the elder's defecation, without the need for manual intervention, effectively solving the problem of caregivers' workload changing from changing paper diapers to adding clean water, dumping waste water, and inspecting equipment, and the problems of dirtiness, fatigue, and odor in the care of urination and defecation.

All electrical components mentioned in the text are connected to the main controller and the power supply. The main controller can be a computer or other conventional known devices that can control, and the existing public power connection technology is not redundant in the text.

While the invention has been described in terms of preferred embodiments, those skilled in the art will recognize that the invention can be practiced with modifications within the spirit and scope of the appended claims.

What is claimed is:

1. An intelligent multipoint bed excretion and automatic cleaning and water filling treatment system, comprising:
    a robot;
    a main machine;
    a bed; and
    an excrement collector fixedly installed in the bed;
    wherein the excrement collector includes an installation block fixedly installed in the bed, an installation seat fixedly installed on the top of the installation block, a flap installed to rotate outside the installation seat, and a cleaning nozzle fixedly installed on the inside of the flap;
    wherein the robot is internally equipped with a waste collection mechanism;
    wherein the main machine is internally equipped with at least one waste discharge mechanism;
    wherein the waste discharge mechanism includes a first collection box and a first booster pump fixedly installed in the main machine; the input end of the first booster pump is fixedly connected to a first waste collection pipe extending to the outside of the main machine; the bottom of the installation block is fixedly connected to a first waste discharge pipe extending to the outside of the bed; and the first waste discharge pipe is fixedly connected to the first waste collection pipe; and
    wherein the waste collection mechanism includes a second collection box and a second booster pump fixedly installed inside the robot; the left side of the robot is fixedly equipped with a second connection pipe connected to the input end of the second booster pump; the side of the second collection box far away from the second booster pump is fixedly connected to a second waste discharge pipe extending to the outside of the robot; and the inside of the second waste discharge pipe is fixedly installed with a third electromagnetic valve extending to the outside of it.

2. The intelligent multipoint bed excretion and automatic cleaning and water filling treatment system of claim 1, wherein the number of the at least one waste discharge mechanism is two; the output end of the first booster pump in another waste discharge mechanism is fixedly connected to a first cleaning pipe extending to the outside of the main machine; the first cleaning pipe is fixedly connected to the cleaning nozzle; the right side of the main machine is equipped with a first connection pipe connected to the first collection box; and the two first booster pumps are respectively connected to the two first collection boxes.

3. The intelligent multipoint bedridden excretion and automatic cleaning and water filling treatment system of claim 2, wherein the inside of the first connection pipe is fixedly installed with a first electromagnetic valve extending to the outside of it; and the inside of the second connection pipe is fixedly installed with a second electromagnetic valve extending to the outside of it.

4. The intelligent multipoint bedridden excretion and automatic cleaning and water filling treatment system of claim 2, wherein the first electromagnetic block is fixedly mounted on the outer side of the first connecting pipe far from the main machine; the second electromagnetic block is fixedly mounted on the outer side of the second connecting pipe far from the robot; the first connecting pipe and the second connecting pipe are fixed by the first electromagnetic block and the second electromagnetic block; and the first connecting pipe is connected to the second connecting pipe.

5. The intelligent multipoint bedridden excretion and automatic cleaning and water filling treatment system of claim 1, wherein the interior of the first collection box is equipped with a first drainage plate that is height-compatible with the first connecting pipe; and the interior of the second collection box is fixedly equipped with a second drainage plate that is height-compatible with the second waste pipe.

6. The intelligent multipoint bedridden excretion and automatic cleaning and water filling treatment system of claim 1, wherein the robot and the main machine are both internally fixedly equipped with four symmetrically distributed wheels, and the size of the two left wheels is different from the size of the two right wheels.

7. The intelligent multipoint bedridden excretion and automatic cleaning and water filling treatment system of claim 1, further comprising a plurality of partition plates fixedly installed between the left and right inner walls of the robot and the main machine, wherein each of the partition plates are equipped with a disinfection mechanism including a disinfection box, a third booster pump, an output pipe, a nozzle, and a linear actuator.

8. The intelligent multipoint bedridden excretion and automatic cleaning and water filling treatment system of claim 7, wherein the disinfection box and the linear actuator are fixedly installed on the upper and lower sides of the partition plate, the nozzle is fixedly connected to the bottom of the output pipe, and the output pipe is fixedly installed on the output end of the linear actuator.

9. The intelligent multipoint bedridden excretion and automatic cleaning and water filling treatment system of claim 7, wherein the output end of the third booster pump is fixedly connected to a connecting pipe which is connected to the output pipe; the two third booster pumps are fixedly installed on the left inner wall of the robot and the main machine; the first collection box and the second collection box both have perforations; and the two output pipes can extend through the perforations into the interior of the first collection box and the second collection box.

10. The intelligent multipoint bedridden excretion and automatic cleaning and water filling treatment system of claim 7, wherein the outer side of the left output pipe is fixedly equipped with two symmetrically distributed cameras; and the interiors of the two disinfection boxes are both fixedly equipped with a first water level sensor.

\* \* \* \* \*